United States Patent [19]
Suehle et al.

[11] Patent Number: 6,008,938
[45] Date of Patent: Dec. 28, 1999

[54] INFLATABLE PORTABLE PROJECTION SCREEN

[76] Inventors: John S. Suehle, 808 Klee Mill Rd., Westminster, Md. 21157; Joseph E. Suehle, 400 S. Taylor Ave.; Andrew G. Suehle, 614 N. Woodward Dr., both of Baltimore, Md. 21221

[21] Appl. No.: 08/852,514

[22] Filed: May 7, 1997

[51] Int. Cl.⁶ .................................................. G03B 21/56
[52] U.S. Cl. ............................................................ 359/443
[58] Field of Search ..................... 359/443, 460, 359/461; 40/736, 610, 214; 52/217; 353/28, 79, 62

[56] References Cited

U.S. PATENT DOCUMENTS

| | | | |
|---|---|---|---|
| 635,697 | 10/1899 | Menkens | 359/443 |
| 2,060,817 | 11/1936 | Mahoney et al. | 359/451 |
| 2,592,444 | 4/1952 | Matelena | 359/451 |
| 3,346,978 | 10/1967 | Letsinger | 40/130 |
| 3,640,601 | 2/1972 | Murray | 350/117 |
| 3,942,869 | 3/1976 | Portner et al. | 350/117 |
| 4,017,152 | 4/1977 | Allen | 350/117 |
| 4,022,522 | 5/1977 | Rain | 350/117 |
| 4,323,301 | 4/1982 | Spector | 350/117 |
| 4,369,591 | 1/1983 | Vicino | 40/610 |
| 4,802,734 | 2/1989 | Walter | 350/117 |
| 5,269,623 | 12/1993 | Hanson | 404/6 |
| 5,471,797 | 12/1995 | Murphy | 52/2.17 |
| 5,555,679 | 9/1996 | Scherba | 52/2.18 |
| 5,570,544 | 11/1996 | Hale et al. | 52/218 |
| 5,617,662 | 4/1997 | Hwang | 40/736 |
| 5,815,966 | 10/1998 | Vestevich | 40/217 |

*Primary Examiner*—Safet Metjahic
*Assistant Examiner*—Christopher E. Mahoney
*Attorney, Agent, or Firm*—Fulbright & Jaworski LLP

[57] ABSTRACT

The cold-air inflatable portable projection screen has two inflatable towers that are connected by an inflatable tube or cross member. A fine mesh material may be suspended between the two towers to form a projection screen. Tethers connected to the towers serve to anchor the structure to the ground. Electric blowers or fans continuously blow air into the structure to keep it erect.

14 Claims, 4 Drawing Sheets

INFLATABLE PORTABLE PROJECTION SCREEN

BACKGROUND OF THE INVENTION

1. Field of the Invention

This invention relates to inflatable structures, specifically, to cold-air inflatable projection screens.

2. Description of the Related Technology

Cold-air inflatable structures are commonly used as buildings, portable shelters, arena coverings, and amusement devices. Such structures are inflated and maintained by means of electric blowers or fans.

Inflatable structures have also been used as portable projection screens. One such example is shown in U.S. Pat. No. 4,802,734. The structure shown in U.S. Pat. No. 4,802,734 is balloon-like, the shape is formed when fully inflated. For projection, a form having a flat surface is desirable.

SUMMARY OF THE INVENTION

This invention offers several advantages over prior art, particularly when very large portable projection surfaces are desired. It is an object of this invention to provide a structure that can withstand significant wind forces when fully erected, particularly when compared to multi-sided or cube-like structures. This advantage is desirable in locations subject to steady winds or breezes such as coastal resorts. The advantage is realized by reducing the wind resistance offered by the structure. The screen itself may be composed of a fine mesh through which wind can flow. A mesh screen cannot be used for a fully enclosed structure since all sides must be air-tight to maintain its shape from the air-pressure produced by the blowers or fans. According to an advantageous feature of the invention, towers may support a mesh screen. The towers can be designed as an aerodynamic shape such as a cone or spire, further increasing its resistance to wind.

It is also an object of this invention to provide a structure that permits simultaneously front and back viewing of the projection screen that is not possible with multi-sided or cube-like inflatable structures.

As indicated above, according to the invention, a portable projection surface is provided that includes two or more inflatable towers, a connecting tube, and a projection screen suspended between the towers. The towers and connecting tube may be made of a durable, substantially air-tight material such as an 18-oz. weigh vinyl-coated nylon fabric, and may be inflated and maintained by a pressurized gas source such as electric air blowers or fans or gas reservoir. The screen may be made of a durable, fine mesh material such as nylon and may be connected to the towers and connecting tube by spring-loaded clips or hooks. Air is advantageously supplied to the tower structures by blowers connected to a duct extending from the base of each structure, although one blower can be used to inflate both structures when they are linked via the connecting tube. Zipper openings allow for entry into the tower structure and deflation. Tethers may be tied throughout the interior of the structure to form and maintain its shape when fully inflated. Tethers may also be connected to the exterior of the structure and used to anchor it to the ground or supporting structure.

The connecting tube may provide a bottom tie down point for the screen and separate the towers to the correct distance when inflated. The connecting tube may be attached to the tower structure by a zipper. The zipper opening also serves as a passage way in which air from the tower can flow into the connecting tube allowing it to be inflated. Internal tethers are also used to form and maintain the shape of the connecting tube.

According to an advantageous feature of this invention, the projection screen may be made of a fine mesh material such that air can flow through it, thus increasing its resistance to wind. It is also a feature of this invention that the projection screen can be view simultaneously from the front and the back since the screen is suspended between two towers.

DETAILED DESCRIPTION OF THE PREFERRED EMBODIMENT

Figure 1:
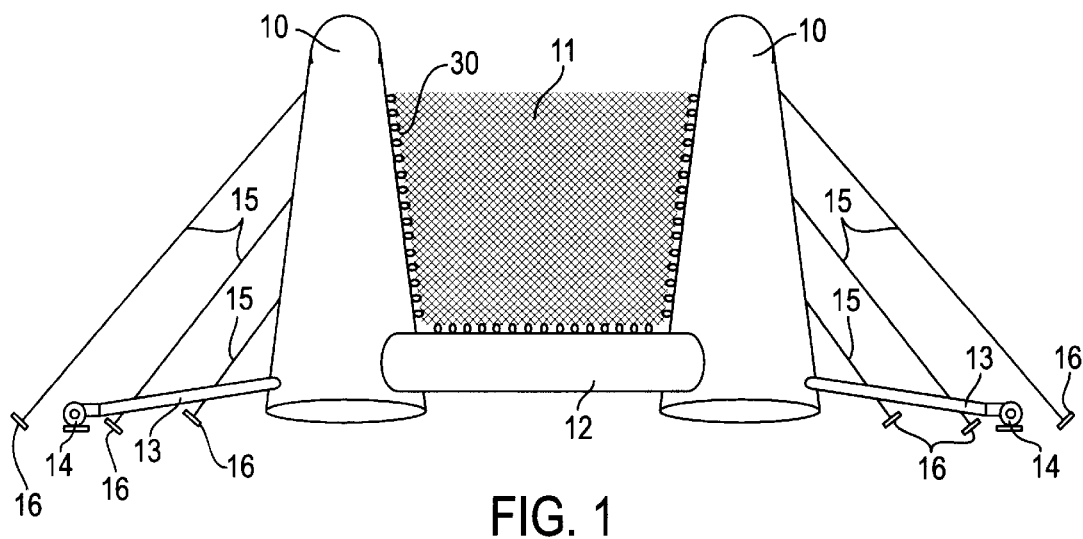
FIG. 1 is a front perspective of a screen according to the invention.
Figure 2:
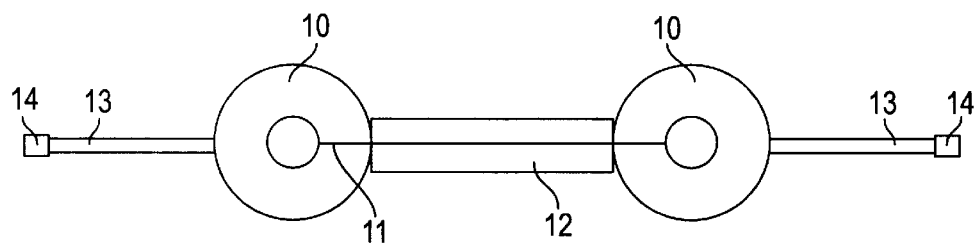
FIG. 2 is a top view of the invention.

FIG. 1 shows that the invention may be constructed with two inflatable towers 10, an inflatable connecting tube 12, and a mesh screen 11 suspended between the towers. The structure may be symmetrical, as shown in the top view, which allows simultaneous viewing from the front and back of the projection screen. The towers and connecting tube may be secured to the ground or supporting surface by external tethers 15 and stakes 16. Alternatively, the tethers may be secure to concrete blocks or water-filled drums or bladders. The structures may be inflated and maintained by electric blowers 14 or fans. Air may be supplied from the blowers to the tower structure by ducts 13. Several external tethers may be connected to the front, side, and rear of each tower by metal clasps, hooks or buckles to a grommet or ring sewn into the structure.

Figure 3:
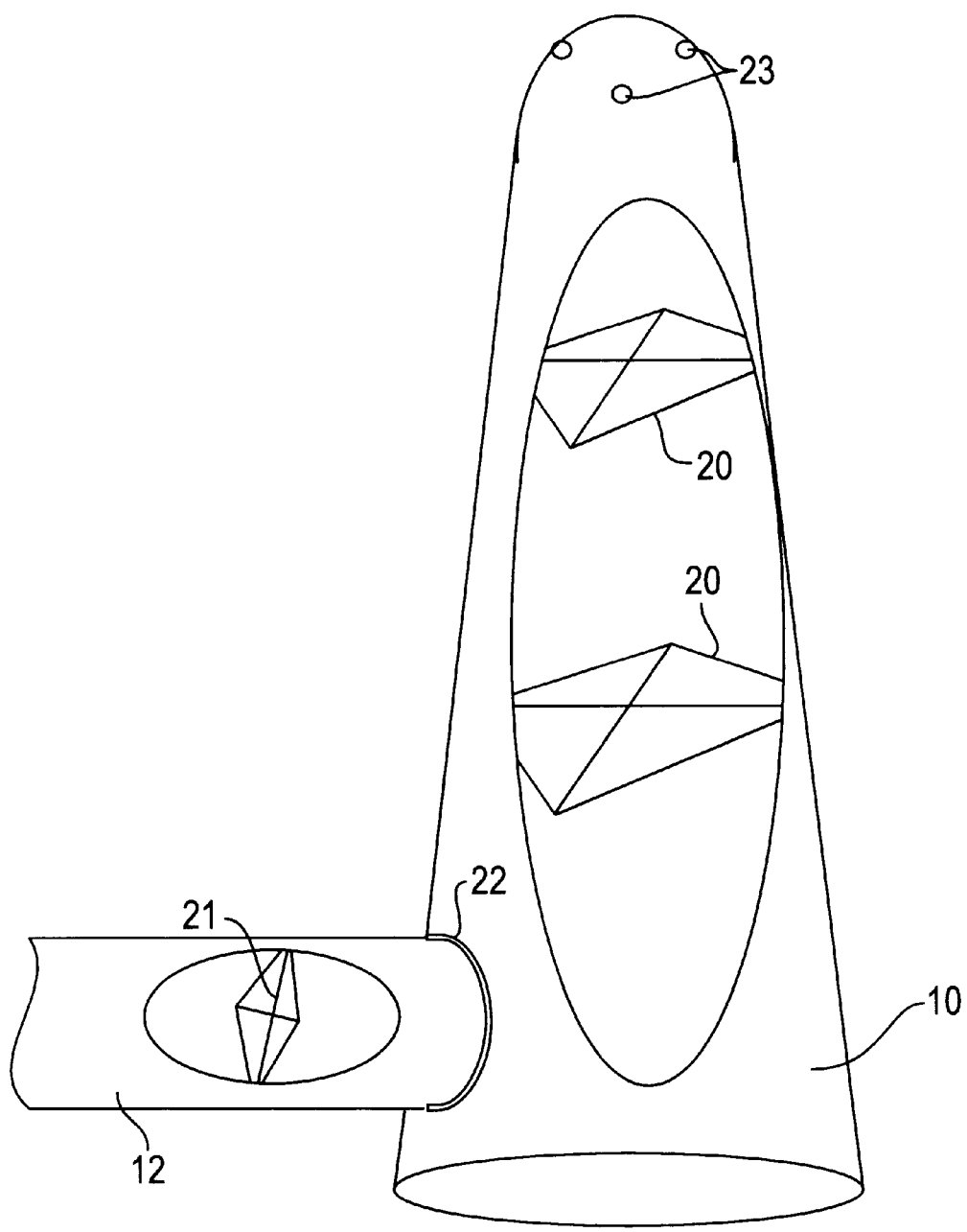
FIG. 3 is a section view of the inflatable tower and connecting tube illustrating the internal tether system, zipper connection port, and external ring attachments.

A sectional view of the inflatable elements of the invention is shown in FIG. 3. The shape of the tower and connecting structure may be maintained by internal tethers 20, 21 which are connected at several internal points throughout each structure. The connecting tube may be attached to the tower structure by a zipper opening 22, which also serves as a port to supply air to it. Since each inflatable piece is connected in this manner, the invention can be easily disassembled and each piece transported separately. Alternatively, the connecting tube may be sewn to the tower structure. The tower structures may also include several metal rings 23 sewn onto its exterior to serve as attachment points for banners or lighting systems. According to a further alternative embodiment, the connecting tube may be a closed end cylinder connected to the towers by straps, buckles, or any other suitable means and having its own pressurized gas source of connected to one of the towers by a conduit.

Figure 4:
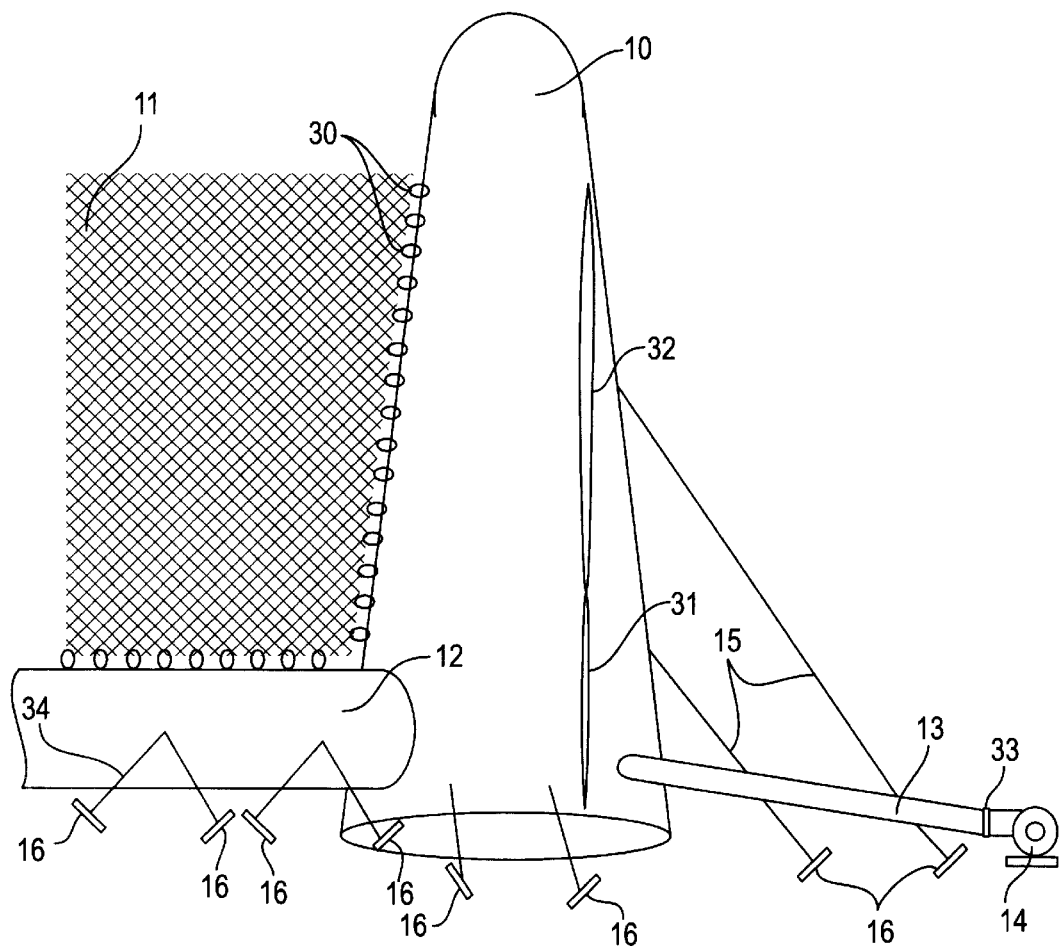
FIG. 4 is a front perspective of the invention showing zipper openings in the tower structure, manner in which the screen is secured to the tower, and tie down means.

As shown in FIG. 4, the mesh projection screen may be attached to the sides of the inflatable towers and connecting tube by metal clasps 30. The clasps may be hooked to grommets or rings sewn on the exterior of the structures. This allows the screen to be completely separated from the inflatable structures and transported separately. Two zipper openings may be sewn into the tower structure. The zipper openings 31 allow entry into the structures for the placement of lighting or other equipment. Another zipper opening 32 runs along the length of tower and is activated in emergency conditions such as when the structure must be quickly deflated in high winds. The blower may be connected to the air duct by a zipper connection 33. All zipper openings and connections may be reinforced by a Velcro flap that covers the zipper when fully closed. Tie down tethers 34 may be located along the length of the connecting tube and around the base of the towers. These tethers may be connected to stakes; concrete blocks or water-filled drums or bladders.

Figure 5:
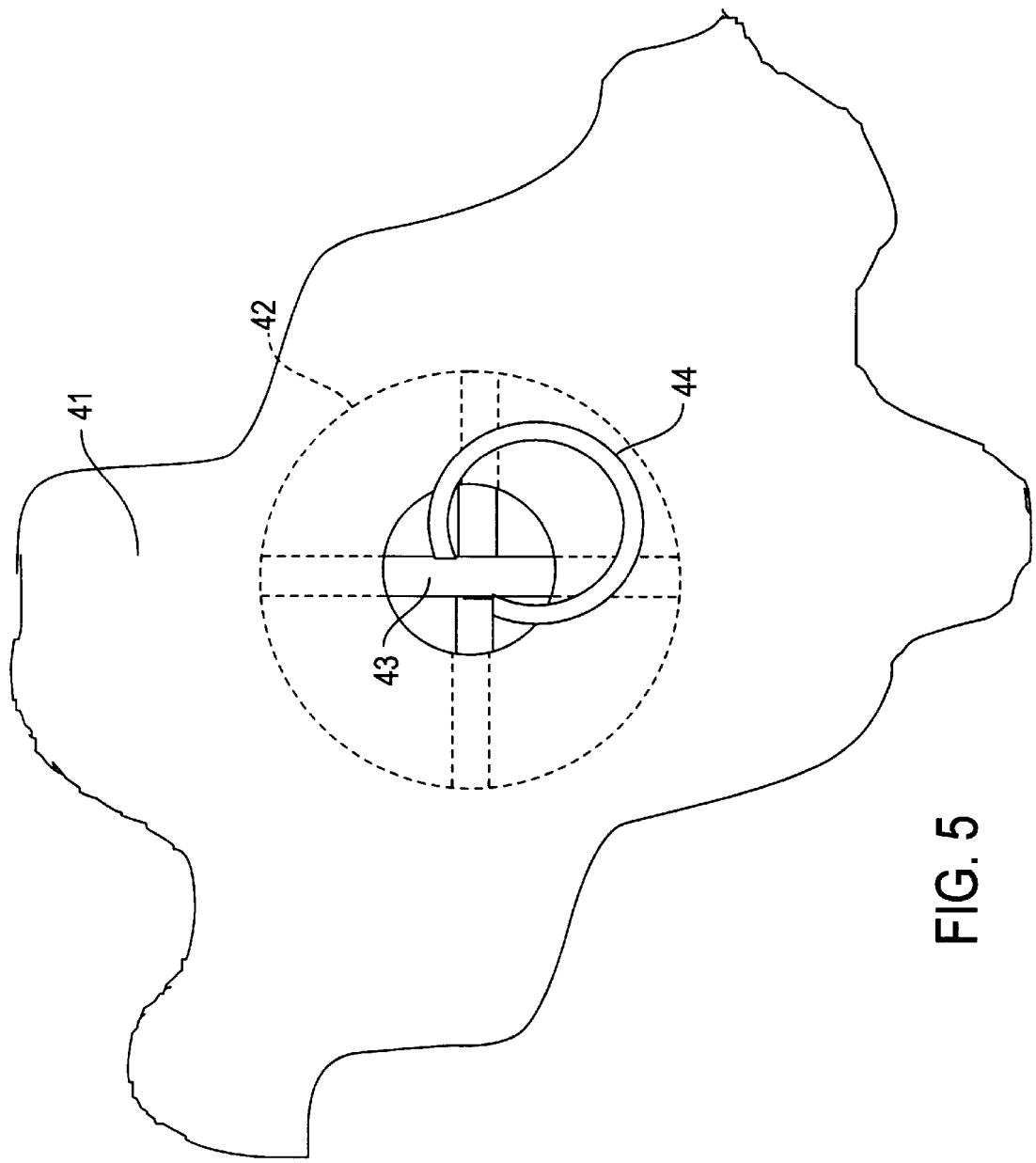
FIG. 5 illustrates the manner in which grommets or rings are attached to the surface of the inflatable structures.

FIG. 5 illustrates the manner in which grommets or rings can be securely attached to the surface of the inflatable structures. An internal stress-relief patch 42 is sewn to the interior surface 41 of the inflatable structure. Tethers 43 comprised of braided nylon fibers or similar material are sewn to form a cross on the stress-relief patch. A small hole is made through the stress-relief patch and through the surface of the inflatable structure. This allows a ring or grommet 44 to be connected to the internal tether cross and extend through the surface material of the inflatable structure such that tethers or tie-downs can be attached.

The modular implementation of the design allows the invention to be easily scaled to any size.

While the preferred embodiment of the invention has been described above in detail, other embodiments, uses, and modifications to the invention can be devised without departing from the scope of the appended claims.

What is claimed is:

1. A portable projection screen comprising:
   a first upright conically shaped inflatable support body;
   a second upright conically shaped inflatable support body;
   a projection screen material made of a fine mesh material suspended on said first upright conically shaped inflatable support body and said second upright conically shaped inflatable support body.

2. A structure according to claim 1, further comprising an electric blower associated with said at least one inflatable support body and wherein said at least one inflatable support body is made of a durable air-tight flexible material.

3. A projection screen according to claim 1 wherein said projection screen material is suspended between said support bodies.

4. A projection screen according to claim 3, wherein said projection screen material is a mesh material.

5. A projection screen according to claim 4, further comprising a tubular connecting member connected between said inflatable support bodies.

6. A projection screen according to claim 4, further comprising a pressurized gas source connected to at least one of said support bodies.

7. A projection screen according to claim 6, wherein said pressured gas source is a blower.

8. A projection screen according to claim 5, wherein said support bodies and said connecting member are made of a durable air-tight flexible material and are attached by a zipper.

9. A projection screen according to claim 8, wherein said bodies are inflated and maintained by air pressure supplied through a port fashioned in the support bodies.

10. A projection screen according to claim 5, wherein said support bodies and connecting members further comprise internal tethers connected at regular intervals along an interior area to form and maintain shape when inflated.

11. A projection screen according to claim 3, wherein said support bodies are configured with multiple inflatable air chambers.

12. A projection screen according to claim 3, further comprising a plurality of rings or grommets located on an exterior surface of said support bodies.

13. A projection screen according to claim 3, further comprising tethers attached at regular intervals on exterior surface of said support bodies.

14. A projection screen according to claim 5, wherein said connecting member is cylindrical or rectangular in shape.

* * * * *